May 12, 1959 D. E. LUPFER ET AL 2,885,885
AUTOMATIC TIME-TEMPERATURE CURVE APPARATUS
Filed Sept. 10, 1956 4 Sheets-Sheet 1

INVENTORS
D.E. LUPFER
D.M. VESPER
BY Hudson & Young
ATTORNEYS

May 12, 1959 — D. E. LUPFER ET AL — 2,885,885
AUTOMATIC TIME-TEMPERATURE CURVE APPARATUS
Filed Sept. 10, 1956 — 4 Sheets-Sheet 2

INVENTORS
D.E. LUPFER
D.M. VESPER
BY Hudson & Young
ATTORNEYS

May 12, 1959 D. E. LUPFER ET AL 2,885,885
AUTOMATIC TIME-TEMPERATURE CURVE APPARATUS
Filed Sept. 10, 1956 4 Sheets-Sheet 3

INVENTORS
D.E. LUPFER
D.M. VESPER
BY
Hudson & Young
ATTORNEYS

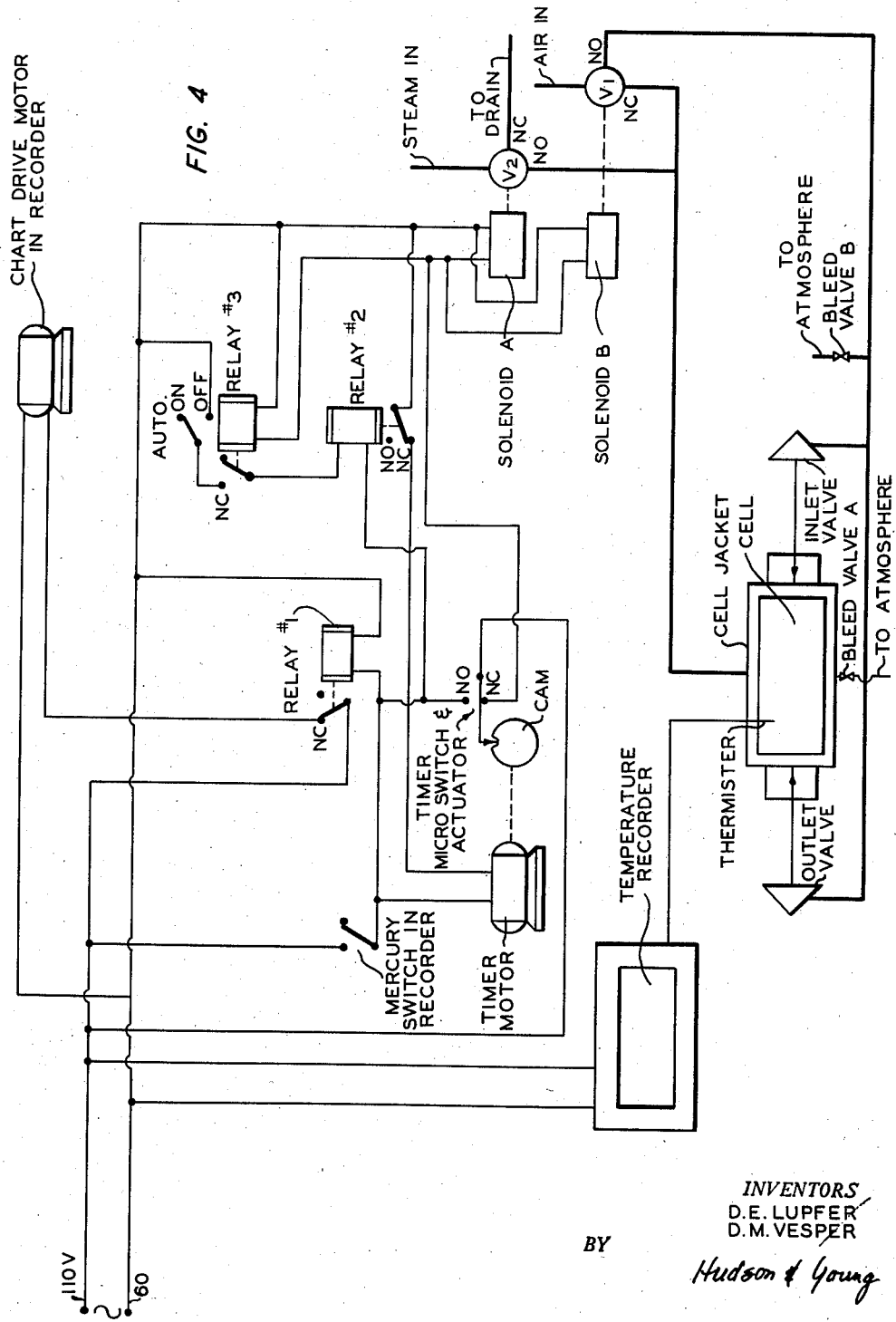

United States Patent Office 2,885,885
Patented May 12, 1959

2,885,885
AUTOMATIC TIME-TEMPERATURE CURVE APPARATUS

Dale E. Lupfer and Daniel M. Vesper, Bartlesville, Okla., assignors to Phillips Petroleum Company, a corporation of Delaware Application September 10, 1956, Serial No. 609,011

11 Claims. (Cl. 73—17)

This invention relates to apparatus for automatically determining the time-temperature curve of a solution. In one of its aspects it relates to apparatus for automatically determining the cooling curve of a solution.

In the operation of many processes it is often times desirable to control those processes with respect to some variable which is readily determinable from a particular characteristic in a time-temperature curve of one of the solutions present. One instance of this can be found in the operation of a prilling tower in a process for the production of prilled ammonium nitrate fertilizer. In operating a prilling tower it is essential that close control be maintained over the concentration of the solution of ammonium nitrate being fed to the sprayers at the top of the tower. A solution of ammonium nitrate concentrated beyond the optimum range will tend to solidify or freeze in the spray header of the prilling tower, while a relatively less concentrated solution, i.e., less than the optimum concentration range, will produce mushy or oblong prills of ammonium nitrate in the prilling operation. The mushy or oblong ammonium nitrate prills contain an excessive amount of water and consequently, these prills when bagged and put into storage will "cake." One method for quickly determining the concentration of the solution is to determine its fudge or mush point. By "fudge point" as used herein we mean that temperature when cooling a concentrated aqueous solution of ammonium nitrate at which the nuclei of ammonium nitrate crystals just begin to form, and by "mush point" as used herein we mean that temperature at which the mixture of crystallized ammonium nitrate and solution becomes mushy. In the concentration range of 95.6 to 98 percent by weight of ammonium nitrate, the fudge point is the temperature at the first break or change in slope in the time-temperature cooling curve of the solution and the mush point is the temperature at the second break in the cooling curve. At concentrations below 95.5 percent the fudge and mush points occur at the same point in the cooling curve. It should be stated, however, that the terms "fudge point" and "mush point" have no generally accepted meaning in the art and their connotations may vary. The fudge point or mush point temperatures of a solution of ammonium nitrate of desired concentration can readily be determined by one skilled in the art. If the fudge point or mush point temperatures are above the predetermined values corresponding to the desired concentration, indicating too high a concentration, the evaporator may be controlled to alleviate the problem. One method of controlling the concentration of an ammonium nitrate solution is disclosed in the copending application of Russell K. Simms, filed August 20, 1951, Serial No. 242,765, now Patent No. 2,734,566. Another method for controlling the concentration of an ammonium nitrate solution is to vary the heat input to the evaporator concentrating the solution.

Accordingly, therefore, one object of this invention is to provide apparatus for automatically determining the time-temperature curve of a solution.

Another object of this invention is to provide apparatus for automatically determining the cooling curve of a solution.

A further object is to provide apparatus for automatically determining the fudge point of a concentrated aqueous solution of ammonium nitrate.

Another object is to provide apparatus for automatically determining the time-temperature curve of a solution, said apparatus containing improved cell or sampling means.

Other objects and advantages of this invention will be apparent to one skilled in the art from the accompanying disclosure and discussion.

Broadly contemplated, our invention comprises apparatus having inlet means in a sample cell unit into which a sample solution is introduced; improved stirrer means within said cell; means for adjusting the temperature of the sample in the cell; outlet means for withdrawing said samples; valve means positioned within the inlet and outlet means; conduit means by-passing said cell and communicating with said inlet and outlet means; a temperature sensing element to detect changes in temperature of the sample; a temperature recorder connected to said temperature sensing element to record said changes in temperature; and a cycle timer actuated by said temperature recorder when a predetermined temperature is recorded to automatically operate responsive means, e.g., pressure responsive means, adapted to actuate said valve means whereby the fresh sample is introduced into said cell unit thus flushing out the old sample. When the old sample has been flushed out, the operation commences again with fresh solution in the cell to be tested.

Figure 4 illustrates an electrical circuit to control the operation of the inlet and outlet valves of the cell apparatus and the temperature recorder controller.

Figure 1:
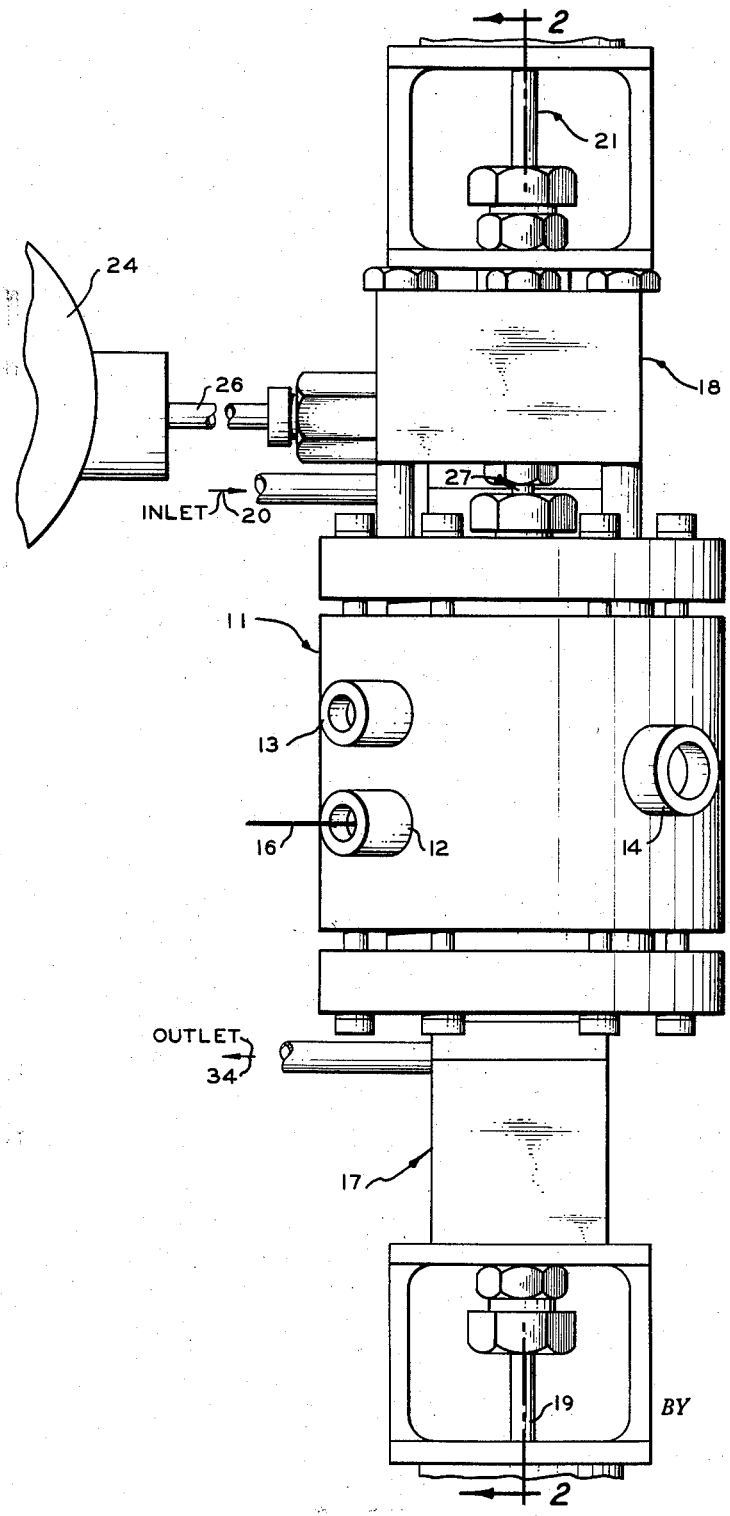
Figure 1 is a plan view partly broken away which illustrates a preferred embodiment of our invention.

Referring now to Figure 1, sample cell unit 11 contains three temperature devices, namely, thermistor well 12, glass thermometer well 13 and dial thermometer 14. Thermistor well 12 is preferably lined with aluminum or other high conducting metal and extends well into the interior of cell unit 11 to insure contact with the sample solution being tested. Thermal electric probe 16 is positioned in thermistor well 12. A glass thermometer (not shown) positioned within glass thermometer well 13 and dial thermometer 14, function as temperature checking devices. Valve assembly 17 is operatively connected to cell unit 11. A second valve assembly hidden from view by gear box 18 and in axial alignment with valve assembly 17 is also operatively connected to cell unit 11. Valve stems 19 and 21 communicate with air motor valve assembly 22 and 23 respectively (shown in Figure 2). Stirrer motor 24 is connected to motor shaft 26 which in turn is connected to gear box 18. Stirrer shaft 27, axially disposed in cell unit 11 is operatively connected to the gear mechanism (not shown) of gear box 18.

Figure 2:
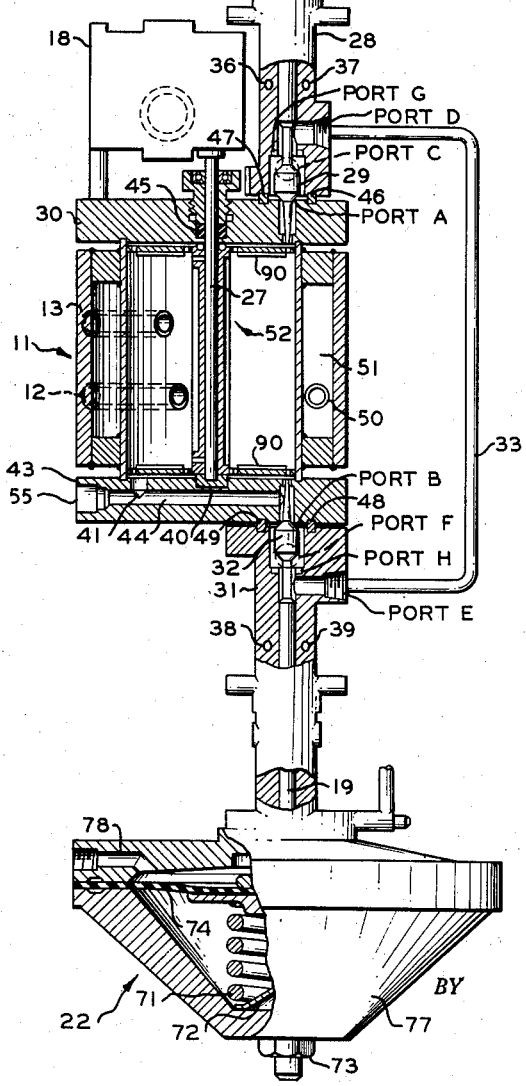
Figure 2 is a cross sectional view of the apparatus shown in Figure 1 taken at line 2—2, said Figure 2 illustrating a preferred embodiment of our invention.

Reference is made to Figure 2 in detail which is a cross sectional view of Figure 1 taken along line 2—2. During a complete cycle, cooling and purging, inlet valve head 29 and outlet valve head 32 assume two positions. Inlet valve head 29 is connected to inlet valve stem 21 which in turn is operatively connected with inlet air motor valve assembly 23, whereas outlet valve head 32 is connected to outlet valve stem 19 which communicates with outlet air motor valve assembly 22. Inlet and outlet valve heads 29 and 32 respectively are positioned within the recess of inlet and outlet valve bodies 28 and 31 respectively. During the cooling half of the cycle, inlet valve head 29 is closed against port A in inlet flange 30 and outlet valve head 32 is closed against port B in outlet flange 43 thereby trapping the ammonium nitrate sample in cell 11. In this position the sample enters the inlet valve at port C from conduit 20 (shown in Figure 1) which is connected to a source not shown, flows back along valve stem 21 and out of inlet valve body 28 at port D. From port D the sample is by-passed around cell 11 through conduit 33, which can be a ¼ inch diameter stainless steel line, and into port E of outlet valve body 31. The solution flows through the outlet valve body and exits at port F via conduit 34 (shown in Figure 1) to be used or disposed of as desired. Inlet and outlet air motor valve assembly, i.e., 23 and 22, respectively, comprise spring 71, spring retainer 72, spring force adjustment nut 73, diaphragm 74, housing 77, and conduits 78. To commence the purging cycle of cell 11, i.e., "old" sample is flushed out of the cell with fresh hot sample, air is admitted under pressure through conduits 78 and into the space defined by diaphragm 74 and the fore-end of the motor valve assembly. The pressure on the diaphragms actuate valve heads 29 and 32 from ports A and B, respectively, and seat said valve heads 29 and 32 in notched ports G and H, respectively. Of course, when the air pressure on the diaphragms is released at the end of the purging cycle, spring 71 actuates valve heads 29 and 32 to a closed position, thus trapping a fresh sample within cell 11 and the cooling curve cycle begins. It will be noted that the inlet and outlet valve bodies are ported for steam tracing at 36, 37, 38, and 39, thus preventing freezing of the sample solution therein. All the sample lines are jacketed through which steam or other heat exchange medium can flow therethrough. When the ammonium nitrate solution is trapped in the cell, air is applied to cell jacket 51, the solution begins to cool, and the temperature of the solution is transmitted to the temperature recorder (shown in Figure 4) by means of thermistor 16. As will be noted, inlet valve head 29 and outlet valve head 32 are preferably given a small surface area contact with the main body, i.e., cell unit 11. This is necessary since these valves are kept hot continuously and if given a large area contact with the main cell body too much heat transfer into the solution in the cell during the cooling half of the cycle would result.

During the purging half of the cycle inlet valve head 29 is closed against port G and outlet valve head 32 is closed against port H. The valve seats of both ports G and H are notched so that full closure is not possible. This will allow a small by-pass flow through by-pass conduit 33 to avoid freezing said conduit. With ports A and B fully opened the cell will be flushed since the largest percentage of the sample entering at port C will flow through cell 11.

As the sample solution is introduced into the cell at port A, the sample solution will compress the air contained therein. To alleviate this difficulty conduit 41 is provided in the upper portion of cell 11, said conduit 41 communicating with conduit 44 contained within flange 43. Conduit 44 extends into the recess provided for the needle-like valve in outlet flange 43. Consequently, when the sample solution is introduced in cell 11, the air contained therein will escape via conduit 41, conduit 44, the recess housing the needle-like valve in flange 43, the recess housing outlet valve head 32 in outlet valve body 31, port F, and into outlet conduit 34 (shown in Figure 1), the said enumerated elements providing a continuous passage for the release of the air present in cell 11. Plug 55 in outlet flange 43 seals conduit 44; other sealing means, of course, can be provided by those skilled in the art. Valve standoffs 46 and 47, containing Teflon[1] gaskets, connect inlet valve body 28 and cell 11, and valve standoffs 48 and 49 containing said gaskets connect the outlet valve body 31 with cell 11. Of course, other means can be employed to connect the valve bodies to the cell; the particular connecting means desired would be apparent to those skilled in the art. Jacket 51 surrounds cell 11, through which steam or other heat exchange medium enters through inlet 50. Secured to the portion of stirrer shaft 27 in cell 11 is a stirrer generally designated 52 which stirrer is described in detail in Figure 3. It will be noted that Teflon bearing 40 and Teflon packer 45 fix the position of stirrer shaft 27.

Figure 3:
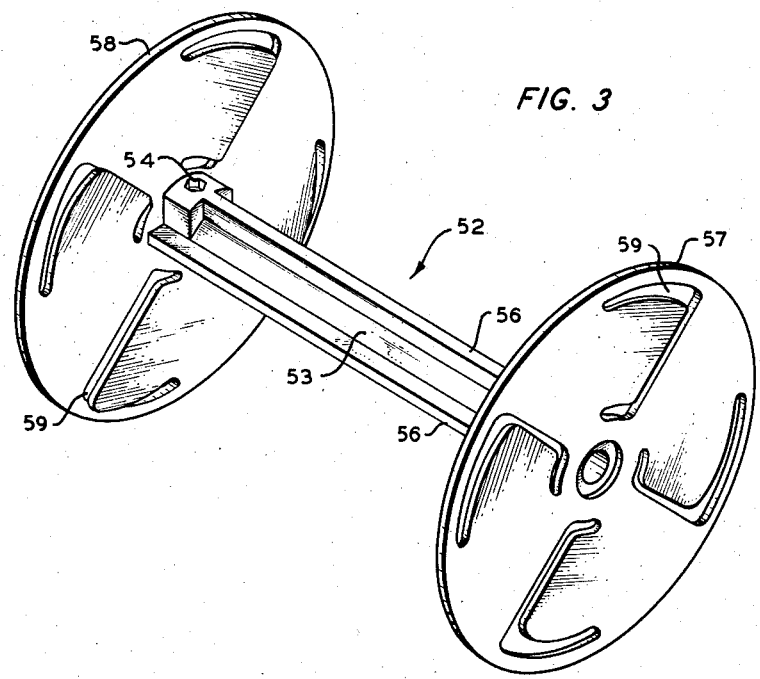
Figure 3 is an enlarged isometric view of the stirring unit shown in Figure 2.

Referring then to Figure 3 stirrer 52 is shown in isometric view and comprises a sleeve or tubular member 53 which surrounds shaft 27 (shown in Figure 2) and is secured thereto by set screws 54 or the like at both extremities of sleeve 53, said sleeve 53 having plurality of radially spaced ribs 56 longitudinally extending the length of sleeve 53. At the respective ends of sleeve 53 are a pair of circular plates or disks 57 and 58 which have a diameter slightly smaller than the inner diameter of the cell. The circular plates are thin circular metal disks preferably aluminum of 0.06 inch thickness with sections 59 hollowed out. Those areas of the plates defined by cut out portions 59, paddles 59, are slightly bent inward, i.e., toward each other; note numeral 90 in Figure 2. The novel design of the stirrer will assure sample flow through the cell, since the sample solution will be cooled below its freezing point during a complete cycle. Our novel stirrer keeps the solution within the cell at uniform temperature throughout its mass during cooling, and secondly, circular plates 57 and 58 and sleeve 53 are so constructed that channel(s) through the total length of the cell will develop as crystallization occurs. This channeling effect guarantees initial flow of the hot ammonium nitrate through the cell at the start of the purging end of the cycle, i.e., flushing out the "old" sample solution. It will be noticed that inlet valve head 29 and outlet valve head 32 have long tapered sections extending into port A and port B respectively of cell 11 (shown in Figure 2). At the start of the purging cycle valve stems 21 and 19 are actuated away from ports A and B leaving a channel in the space previously occupied by the tapered valve heads which connect to the channel(s) formed by stirrer 52 within cell 11. The stirrer is rotated continuously by an electrical motor, preferably at 3 r.p.m.

Sequencing of the apparatus cycle is accomplished by the control circuits shown in Figure 4. Assuming that the apparatus is in the cooling position; solenoid valves A and B are both energized through the timer microswitch with the timer microswitch being in the N.C. (normally closed) position. For the present, assume that the switch labeled Auto is in the on position. Relay 3 is also energized and its contacts open. Relay 2 is deenergized and its contacts are closed. Relay 1 is deenergized and its contacts are closed so that the recorder chart drive motor will run while the cooling curve is in progress. The mercury switch which is actuated from the pen of the recorder or slide wire pointer (not shown) is open. The point at which the mercury switch is closed by the recorder pen is adjustable. As the recorder pen progresses down scale during cooling, the mercury switch trips at a preset point on the chart. This, then, is what initiates a new cycle. When the mercury switch is tripped, a circuit is completed through Relay 1 and the timer motor. The Relay 1 contacts open to stop the recorder chart drive so that the chart can be conserved during the purging cycle. The timer motor starts to run immediately when the mercury switch is closed. Within a few seconds after the timer motor starts, the timer cam will switch its microswitch from the N.C. (normally closed) to the open position. This kills power to both

---

[1] Polymerized tetrafluoroethylene.

solenoids A and B admitting air through 3-way solenoid operated valve $V_1$ to the inlet and outlet valve diaphragms and admitting steam through 3-way solenoid operated valve $V_2$ to the cell jacket. Also, Relay 3 is deenergized so that if the auto switch is in the off position, power will be cut off the timer motor since Relay 2 will be energized and open switch 2. The apparatus will continue in this purge position until the auto switch is placed back on the on position. When the timer switch first flips from N.C. to open and both solenoids A and B are deenergized, hot nitrate starts through the cell. With hot nitrate in the cell, the recorder pen travels upscale opening the mercury switch. The timer motor now receives power through the timer microswitch. Purging of the cell will continue until the timer cam completes one revolution which is adjusted to take about 15 minutes. At the end of this revolution the timer microswitch flips back to the N.C. position, killing power to the timer motor, and energizes solenoids A and B so that the apparatus will start on a cooling curve. Solenoid valve $V_2$ switches steam off the cell jacket to a steam trap not shown. Solenoid valve $V_1$ switches air from the diaphragm valves to the cell jacket to facilitate cooling of the trapped solution in the cell. The air thus trapped in the diaphragm valves is released through bleed valve B. Bleed valve A in the cell jacket is opened slightly to allow a flow of air through the cell jacket during the cooling cycle, yet furnishes enough restriction during the purge cycle to maintain the desired steam pressure.

Figure 5:
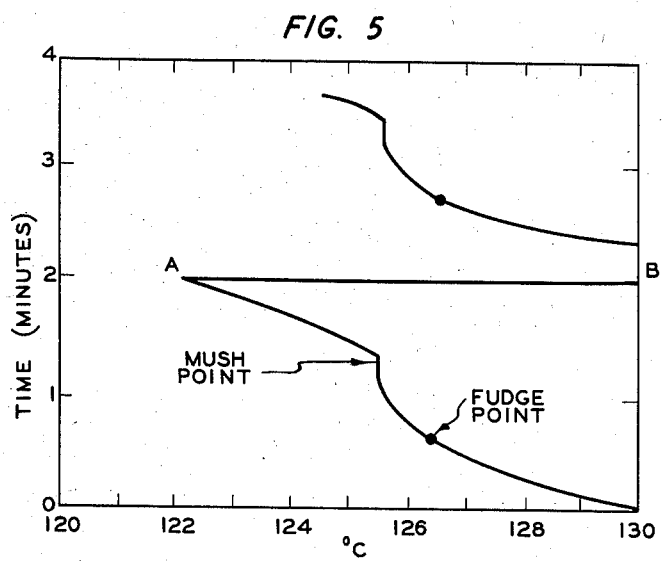
Figure 5 represents a typical cooling curve of a concentrated aqueous solution of ammonium nitrate as recorded on the chart of an electric recorder used in the apparatus of our invention.

Referring now to Figure 5, wherein there is illustrated a typical cooling curve of a concentrated aqueous solution of ammonium nitrate as recorded upon the chart of the temperature recorder. During the cooling cycle it will be noted that the fudge point occurred at a temperature of approximately 126.5° C. and the mush point occurred at a temperature of approximately 125.6° C. for an aqueous ammonium nitrate solution of about 95.5 percent concentration. When the temperature of the solution was lowered to about 122° C. (point A), the mercury switch was tripped and the purge cycle commenced. During purging, the chart drive motor was stopped to conserve the chart paper. As the hot ammonium nitrate solution entered the cell unit, the recorder pen is driven upscale as shown by horizontal line AB to a preset temperature of approximately 137° C. When the cam has completed one revolution (about 15 minutes), the timer microswitch actuator falls into the groove of the cam and a new cooling cycle commences.

This invention has been described and exemplified in terms of its preferred embodiments. However, one skilled in the art will readily appreciate that modifications may be made without departing from the spirit and scope of the invention.

We claim:

1. In an apparatus for automaticaly determining the cooling curve of a solution which comprises a cell unit; means to introduce a sample of the solution into said cell; means to withdraw the sample from said cell; a thermal electric sensing element to detect changes in the temperature of the solution; a temperature recorder connected with said thermal electric sensing element to record said changes in temperature; the improvement which comprises agitation means comprising a sleeve which surrounds a shaft coaxially disposed and extending the length of the cell, said sleeve having a plurality of radially spaced ribs longitudinally extending the length of said sleeve whereby a channel is provided between the extremities of said sleeve, a pair of circular plates attached to the extremities of said sleeve, said plates having a diameter slightly smaller than the inner diameter of said cell and said plates being perforated to provide a plurality of paddles, said paddles being slightly bent toward each other whereby a channel is provided adjacent to each plate, the channels formed by said plates and by said sleeve adjoining each other and the means for withdrawing and introducing said sample whereby a continuous channel is provided through said cell and means to operate said agitation means.

2. The apparatus of claim 1 which comprises means to withdraw air from said cell.

3. In an apparatus for automatically determining the cooling curve of a solution which comprises a cell unit having a flanged inlet port to introduce a sample of the solution into said cell and a flanged outlet port to withdraw a sample from said cell; a thermal electric sensing element to detect changes in the temperature of the solution; a temperature recorder connected with said thermal electric sensing element to record said changes in temperature; the improvement which comprises agitation means comprising a sleeve which surrounds a shaft coaxially disposed and extending the length of the cell, said sleeve having a plurality of radially spaced ribs longitudinally extending the length of said sleeve whereby a channel is provided between the extremities of said sleeve, a pair of circular plates attached to the extremities of said sleeve, said plates having a diameter slightly smaller than the inner diameter of said cell said plates being perforated to provide a plurality of paddles, said paddles being slightly bent toward each other whereby a channel is provided adjacent to each plate, the channels formed by said plates and by said sleeve adjoining each other and said inlet and outlet ports whereby a continuous channel is provided through said cell; and said shaft operatively connected to a motor to rotate said shaft and said agitation means; an inlet valve body affixed to the flange of said inlet port, the internal channel of said inlet valve body being in coaxial alignment with said inlet port; an outlet valve body affixed to the flange of said outlet port, the internal channel of said outlet valve body being in coaxial alignment with said outlet port; needle-like valve heads cooperating with said inlet and outlet ports; and means to simultaneously actuate said needle-like valve heads whereby the solution is trapped within said cell during the cooling curve cycle and withdrawn during the purging cycle.

4. The apparatus of claim 3 wherein a conduit by-passes said cell and operatively communicates with the channels of said inlet and outlet valve bodies respectively.

5. The apparatus of claim 3 wherein the valve seats of said inlet and outlet valve bodies are notched thus affording a continuous passage for solution through the by-pass conduit when the inlet and outlet valve heads are in an open position during the purging cycle.

6. The apparatus of claim 5 wherein said cell is jacketed and a heat exchange medium flows therethrough; wherein said by-pass conduit is jacketed and a heat exchange medium flows therethrough; and means for heating said inlet and outlet valve bodies.

7. The apparatus of claim 6 wherein said inlet and outlet valve bodies are ported for steam tracing.

8. Apparatus for automatically determining the fudge point of a concentrated aqueous ammonium nitrate solution which comprises, in combination, a closed jacketed sample container having a flanged inlet port and a flanged outlet port; an inlet valve body affixed to the flange of said inlet port, the internal recess of said inlet valve body being in coaxial alignment with said inlet port; an outlet valve body affixed to the flange of said outlet port, the internal recess of said outlet valve body being in coaxial alignment with said outlet port; an inlet conduit for continuously drawing a sample of the solution into the recess of said inlet valve body and an outlet conduit for continuously withdrawing a sample of the solution from the recess of said outlet valve body; stirring means for constantly agitating the sample within said container comprising a tubular member which surrounds a shaft coaxially disposed and extending at least the internal length of the container, said tubular member having a plurality of radially spaced ribs longitudinally extending the length of said tubular member whereby a channel is provided between the extremities of said member; a pair of disks attached to the extremities of said tubular member, said disks having a diameter slightly smaller than the inner diameter of said container and said discs being perforated to provide a plurality of paddles, said paddles being slightly bent toward each other whereby a channel is provided adjacent to each disc, the channels formed by said discs and by said tubular member adjoining each other and said inlet and outlet ports whereby a continuous channel is provided through said apparatus; needle-like valve heads cooperating with said inlet and outlet ports; means to simultaneously actuate said inlet and outlet valve heads; a conduit by-passing said cell and operatively communicating with the recess in said inlet and outlet valve bodies; notched valve seats in said inlet and outlet valve bodies to afford a continuous passage for solution through the by-pass conduit when the inlet and outlet valve heads are in an open position during the purging cycle; a thermal electric sensing element mounted in said sample container to detect changes in the temperature of said sample; a temperature recorder connected with said thermal electric sensing element to record said changes in temperature; and a cycle timer actuated by said temperature recorder.

9. The apparatus of claim 8 wherein steam is circulated through the jacket of said sample container during the purging cycle and wherein air is circulated through the said jacket during the cooling curve cycle.

10. The apparatus of claim 9 wherein the inlet and outlet valve bodies are ported for steam tracing and wherein the by-pass conduit is jacketed for steam circulation therethrough.

11. The apparatus of claim 10 which comprises means for withdrawing air from said sample container.

References Cited in the file of this patent

UNITED STATES PATENTS

| | | |
|---|---|---|
| 865,128 | Smith | Sept. 3, 1907 |
| 1,498,392 | Levy | June 17, 1924 |
| 1,516,792 | Ruggles | Nov. 25, 1924 |
| 2,672,751 | Lupfer et al. | Mar. 23, 1954 |